United States Patent [19]
Mueller

[11] 3,968,411
[45] July 6, 1976

[54] TRANSMITTER-RECEIVER PROTECTION DEVICE

[75] Inventor: Heinz G. Mueller, Woodbridge, Va.

[73] Assignee: The United States of America as represented by the Secretary of the Army, Washington, D.C.

[22] Filed: Mar. 27, 1975

[21] Appl. No.: 562,627

[52] U.S. Cl. .............................. 317/61.5; 179/184; 343/904; 325/150; 325/362
[51] Int. Cl.² .................................. H02H 7/20
[58] Field of Search ............... 317/61, 61.5, 69, 70, 317/62; 343/904; 325/21, 22, 150, 151, 362; 179/184; 313/34

[56] References Cited
UNITED STATES PATENTS

| 2,005,147 | 6/1935 | Langguth et al. | 317/70 X |
| 2,654,857 | 10/1953 | Finkel | 317/69 |
| 2,906,925 | 9/1959 | Yonkers et al. | 317/61 |
| 2,959,692 | 11/1960 | Marx | 317/69 X |
| 3,181,033 | 4/1965 | Bakker | 179/184 X |
| 3,274,447 | 9/1966 | Nelson | 317/61 |
| 3,320,462 | 5/1967 | Kawiecki | 317/61.5 X |
| 3,550,000 | 12/1970 | Grilk | 325/22 X |
| 3,728,731 | 4/1973 | Choi et al. | 325/21 X |

*Primary Examiner*—J D Miller
*Assistant Examiner*—Patrick R. Salce
*Attorney, Agent, or Firm*—Nathan Edelberg; Robert P. Gibson; Saul Elbaum

[57] ABSTRACT

A protection device having a spark gap device connected between an antenna and ground and a spark gap device connected between the input to the receiver and ground for shunting electromagnetic transients to ground.

2 Claims, 5 Drawing Figures

TRANSMITTER-RECEIVER PROTECTION DEVICE

The invention described herein may be manufactured, used and licensed by or for the United States Government for governmental purposes without the payment to me of any royalty thereon.

BACKGROUND OF THE INVENTION

1. Field of the Invention

This invention relates generally to protection devices for radio equipment and more specifically to a protection device for transmitter-receiver.

2. Description of the Prior Art

In high frequency radio systems, a need exists for the protection of the components of the receiver and transmitter devices from high amplitude, short duration electromagnetic transients. These transients are capable of permanently damaging critical and sensitive circuitry in both the receiver and the transmitter. It is well known in separate transmitter and receiver units to protect the receiver from such transients. The prior art has not confronted the problem of protecting the transmitter. This is particularly critical in units where the transmitter and receiver use the same antenna.

In units where the transmitter/receiver uses the same antenna, relay or other circuit breaker type of circuitry has been used to protect the transmitter and receiver. These units are not sufficiently fast to prevent the transmission of high amplitude, short duration transients. Thus, there exists a need in the art to protect not only the receiver but also the transmitter in a single antenna unit. Since the transmitter is more sensitive to changes of capacitance in its output circuit, the devices of the prior art which were capable of protecting the transmitter from such transients also prevented the transmitter from transmitting. Thus, there exists a need for a protection device for a transmitter which will not interfere with its capability to transmit.

SUMMARY OF THE INVENTION

The protection device of the present invention prevents high amplitude, short duration electromagnetic transients from being transmitted from a common antenna to the transmitter or receiver. The protection device includes a first spark gap device having one terminal connected between the antenna and a TR switch, and a second terminal connected to a point of common potential or ground. A second spark gap device is provided in the receiver circuit having a first terminal between the TR switch and the receiver and a second terminal connected to the point of common potential. By providing the two spark gap devices, the transmitter and the receiver are protected from the high amplitude, short duration transients. In order to protect the transmitter and receiver from the transient while allowing proper, tunable transmission from the transmitter, the first spark gap device should have a capacitance below 10pf. As an additional point of safety, the first spark gap device includes a third spark gap device in parallel between the antenna circuit and the point of common potential. The first and third spark gap devices have their second terminals connected to the housing at separate and distinct points which may be, for example, 180° apart.

OBJECTS OF THE INVENTION

An object of the present invention is to provide a protection device for a transmitter and receiver using a common antenna.

Another object of the invention is to provide a protection device which permits normal operation of the transmitter.

Another object of the invention is to provide protection of a transmitter/receiver system, operating at two to 30mHz, from high amplitude, short duration electromagnetic transients.

Other objects, advantages and novel features of the present invention will become apparent from the following detailed description of the invention when considered in conjunction with the accompanying drawings.

BRIEF DESCRIPTION OF THE PREFERRED EMBODIMENTS

Figure 1:
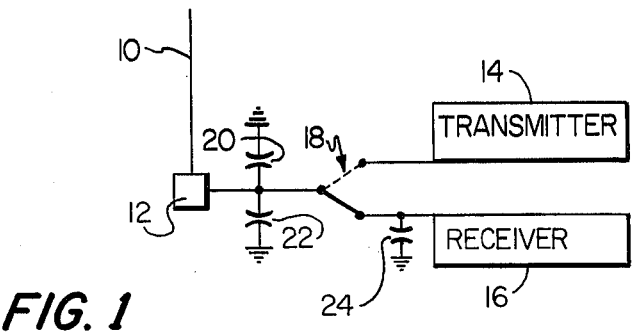
FIG. 1 is a schematic of a preferred embodiment of the protection device of the present invention.

FIG. 1, which illustrates a preferred embodiment of the protection device, shows an antenna 10 (which may be a whip antenna) having a base 12. The antenna is connected to a transmitter 14 and a receiver 16 by a TR switch represented schematically as 18. During normal use, the TR switch connects the transmitter and the receiver separately to the antenna 10 during appropriate periods of transmission and reception, respectively. Connected in the circuit between the antenna 10 and the TR switch 18 are two spark gap devices 20 and 22, whose other end is connected to a point of common potential or ground. Similarly, in the receiver input, between the TR switch 18 and the receiver circuit 16 is shown another spark gap device 24 whose other end is also connected to a point of common potential or ground.

The two spark gap devices 20 and 22 are connected near the base 12 of the antenna 10 and sense high amplitude, short duration electromagnetic transients in less than 10 nanoseconds and shunts the transients to ground. If the radio happens to be in the receiver mode at the time of the transient, any energy passed by the spark gap devices 20 and 22 are shunted to ground by the spark gap device 24 installed in the more sensitive receiver branch and thus keeps the energy entering the receiver to a harmless level. The spark gap devices 20 and 22 in the antenna circuit permit normal operation of the radio by keeping the capacitance added in the extremely sensitive tuning circuit to below 10pf. Additional capacitance larger than 10pf would not permit frequency tuning of the radio and thus would make the transmitter substantially inoperative. The spark gap devices 20 and 22 not only must have low capacitance, but also must be capable of routinely passing RF voltages in excess of the 10,000 peak to peak voltage when the radio is transmitting at its normal output of approximately 400 watts. Though the present protective device was designed for a 2–30mHz transmitter, the principals are applicable to all high frequency, radio transmission devices.

Spark gap devices 20, 22 and 24 may be any commercially available spark gap device. For one radio system in which the present system has been installed, spark gap devices having a capacitance of approximately 1pf apiece and a breakdown DC voltage of 9,000 volts was used. These numbers are mere examples and any spark gap device having the proper breakdown voltage and minimum capacitance can be used.

Figure 3:
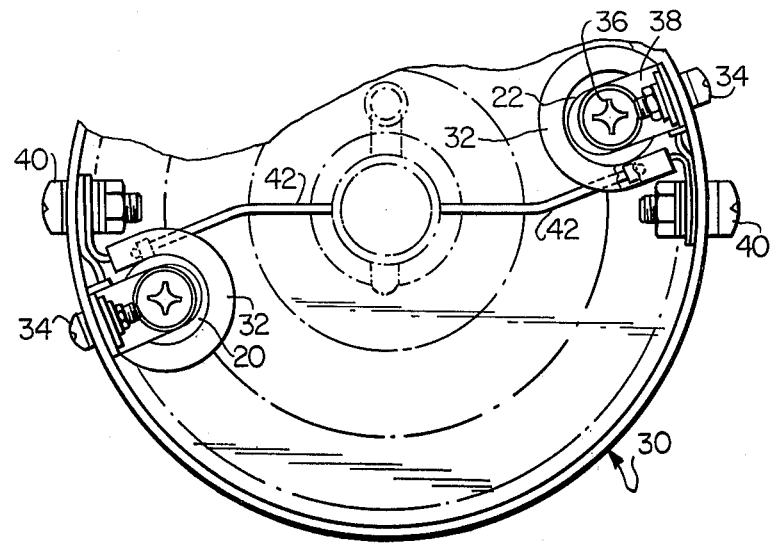
FIG. 3 is a bottom view, taken along line 3—3 of FIG. 2.
Figure 2:
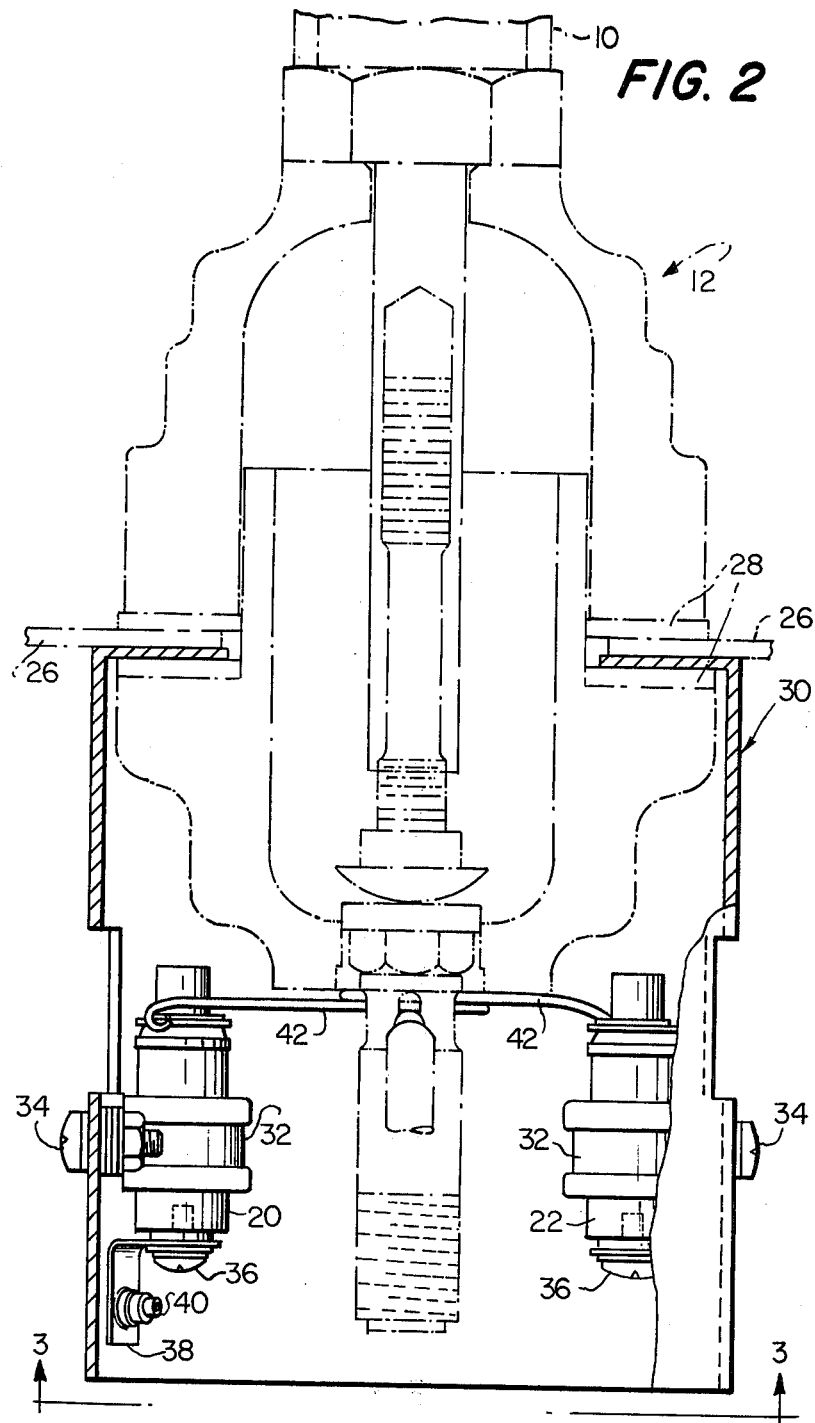
FIG. 2 is a cut away view of a side elevation of a portion of the protection device of the present invention mounted to the base of an antenna.

The location and mounting of spark gap devices 20 and 22 to the base antenna is illustrated in FIGS. 2 and 3. A whip antenna 10 with a base 12 is shown in phantom since a specific antenna structure is not critical to the present invention. The antenna base 12 is mounted to a vehicle mounting flange 26 and separated therefrom by dielectric materials 28. A metal housing 30 is provided for the base of the antenna and the connection mounting of the spark gap devices 20 and 22 thereto. The housing 30 is secured to the vehicle mounting frame 26 by the base of the antenna and is separated from the base of the antenna by dielectric material 28. The spark gap devices 22 and 20 are mounted to the casing 30 by clamps 32 and fasteners 34. A fastener 36 electrically connects one end of the spark gap devices 20 and 22 to a bracket 38 which is connected to housing 30 by fastener 40. The individual fasteners 40 may be individually connected to a common point of potential or ground, or the total casing 30 may be grounded to the vehicle through the vehicle mounting flange 26. As illustrated in FIG. 3, the connection of the ground lead of the spark gap devices 20 and 22 or to the frame at separate and distinct points which are shown to be approximately 180° apart. As will be explained more fully below, this form of connection provides a safer distribution of the high amplitude, short duration pulses to the ground circuit through the casing. The other terminal of the spark gap devices 20 and 22 is connected to the base of the antenna by a lead 42. It should be noted that lead 42 is connected at the base of the antenna since this is the point of maximum power density.

Figure 4:
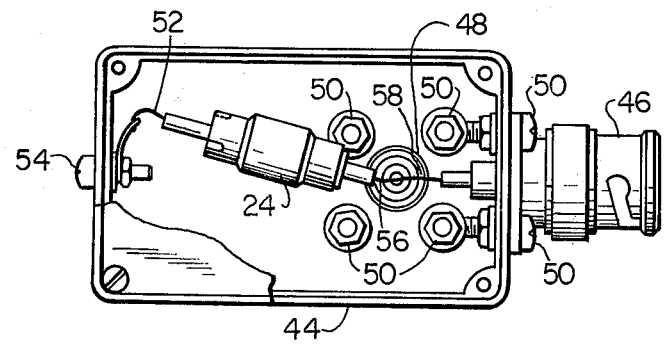
FIG. 4 is a cut away sectional view of a portion of the protection device of the present invention connected to the receiver circuit.
Figure 5:
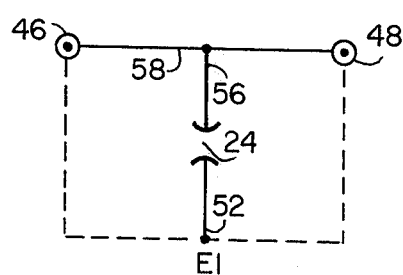
FIG. 5 is a schematic of the portion of the protection device illustrated in FIG. 4.

The spark gap device 24 in the receiver circuit is shown in place mounted in FIG. 4 and schematically in FIG. 5. A metal casing 44 is provided having an input coaxial connector 46 and an output coaxial connector 48 mounted thereto by a plurality of fasteners 50. A lead 52 contains one end of spark gap device 24 to the casing 44 through a fastener 54. The casing 44 may be connected to a point of common potential or ground or the fasteners 54 may be connected directly to ground. The other end of the spark gap device 24 is connected by lead 56 to a lead 58 connecting the center electrode of the coaxial connectors 46 and 48. From the drawings of FIGS. 2, 3 and 4, it is obvious that the protective device of the present invention including spark gap devices 20, 22 and 24, are easily mounted into existing systems without major modification. The two spark gap devices 20 and 22 are to have a capacitance below 10pf so as to not interfere with the frequency sensitive tuning circuitry of the transmitter. It should be noted that possibly only one of these two spark gap devices may be used, but in view of the extremely large possible high amplitude short duration electro-transients which could exist, a second spark gap device is provided as a safety measure.

I wish it to be understood that I do not desire to be limited to the exact details of construction shown and described, for obvious modifications can be made by a person skilled in the art.

What is claimed:

1. In a transmitter-receiver system having an antenna, a TR switch, a transmitter and a receiver, an improvement comprising a protection device having a housing;

two spark gap devices connected in parallel, each of said spark gap devices having first terminals connected to the base of said antenna between said antenna and said TR switch and second terminals connected to said housing at separate and distinct points of common potential; and additional spark gap means having a first terminal connected between said TR switch and said receiver and a second terminal connected to a point of common potential.

2. The system of claim 1 wherein said two spark gap devices connected in parallel have a capacitance below 10 picofarads.

* * * * *